US011725938B2

United States Patent
Sasaki (10) Patent No.: US 11,725,938 B2
(45) Date of Patent: Aug. 15, 2023

(54) SURVEYING APPARATUS, SURVEYING METHOD, AND SURVEYING PROGRAM

(71) Applicant: Topcon Corporation, Tokyo (JP)

(72) Inventor: You Sasaki, Tokyo (JP)

(73) Assignee: Topcon Corporation, Tokyo (JP)

( * ) Notice: Subject to any disclaimer, the term of this patent is extended or adjusted under 35 U.S.C. 154(b) by 408 days.

(21) Appl. No.: 16/917,941

(22) Filed: Jul. 1, 2020

(65) Prior Publication Data
US 2021/0033394 A1 Feb. 4, 2021

(30) Foreign Application Priority Data
Jul. 30, 2019 (JP) .................. 2019-139536

(51) Int. Cl.
G01S 7/481 (2006.01)
G01C 15/00 (2006.01)
G01C 15/06 (2006.01)
G01S 17/42 (2006.01)

(52) U.S. Cl.
CPC ........... *G01C 15/006* (2013.01); *G01C 15/06* (2013.01); *G01S 7/4817* (2013.01); *G01S 17/42* (2013.01)

(58) Field of Classification Search
CPC ....... G01S 7/4817; G01S 17/42; G01C 15/06; G01C 15/006
See application file for complete search history.

(56) References Cited

U.S. PATENT DOCUMENTS 7,726,033 B2 6/2010 Ohtomo et al.
7,861,423 B2 1/2011 Kumagai et al.
7,969,558 B2 6/2011 Hall
8,045,762 B2 10/2011 Otani et al.
8,310,653 B2 11/2012 Ogawa et al.
(Continued)

FOREIGN PATENT DOCUMENTS

JP 2007-212264 A 8/2007
JP 2008-268004 A 11/2008
(Continued)

OTHER PUBLICATIONS

Extended European Search Report dated Jan. 13, 2021, in connection with European Patent Appl. No. 20184360.4, 9 pgs.
(Continued)

*Primary Examiner* — Yuqing Xiao
*Assistant Examiner* — Zhengqing Qi
(74) *Attorney, Agent, or Firm* — Chiesa, Shahinian & Giantomasi PC (57) ABSTRACT

Reselection of an instrument point, due to the limited emission range of a scanning laser light, is performed with decreased burden. A total station equipped with a laser scanner has a combined structure of a total station and a laser scanner. The total station equipped with the laser scanner includes a point cloud data acquiring unit, a distance acquiring unit, and an instrument point calculator. The point cloud data acquiring unit acquires point cloud data that is obtained through laser scanning performed by the laser scanner set up at a first instrument point. The distance acquiring unit acquires a distance to the laser scanner of each point in the point cloud data. The instrument point calculator calculates a location of a second instrument point on the basis of an upper limit of the distance.

8 Claims, 5 Drawing Sheets

Instrument point "A"

Instrument point "B"

Point cloud data of a wall of a room obtained at an instrument point "A"

(56) References Cited

U.S. PATENT DOCUMENTS

| | | | |
|---|---|---|---|
| 8,355,118 | B2 | 1/2013 | Ogawa et al. |
| 8,767,190 | B2 | 7/2014 | Hall |
| 9,207,069 | B2 | 12/2015 | Kitamura et al. |
| 9,523,575 | B2 | 12/2016 | Kumagai et al. |
| 9,658,059 | B2 * | 5/2017 | Metzler et al. ......... G01B 11/14 |
| 9,977,983 | B2 | 5/2018 | Koch et al. |
| 2008/0075326 | A1 | 3/2008 | Otani et al. |
| 2009/0235541 | A1 | 9/2009 | Kumagai et al. |
| 2009/0241358 | A1 | 10/2009 | Ohtomo et al. |
| 2010/0256940 | A1 | 10/2010 | Ogawa et al. |
| 2012/0218546 | A1 | 8/2012 | Ogawa et al. |
| 2012/0242830 | A1 | 9/2012 | Kumagai et al. |
| 2012/0256916 | A1 | 10/2012 | Kitamura et al. |
| 2015/0029324 | A1 | 1/2015 | Tanabe |
| 2015/0206023 | A1 | 7/2015 | Kochi et al. |
| 2017/0026917 | A1 | 1/2017 | Emmanuel et al. |
| 2018/0158200 | A1 * | 6/2018 | Metzler et al. ......... G06T 7/337 |
| 2020/0363202 | A1 * | 11/2020 | Metzler et al. ......... G01C 11/08 |

FOREIGN PATENT DOCUMENTS

| | | |
|---|---|---|
| JP | 2009-229192 A | 10/2009 |
| JP | 2010-151682 A | 7/2010 |
| JP | 2012-202821 A | 10/2012 |
| JP | 5057734 B2 | 10/2012 |
| JP | 2012-230594 A | 11/2012 |
| JP | 5124319 B2 | 1/2013 |
| JP | 2014-035702 A | 2/2014 |
| JP | 2014137244 A | 7/2014 |
| JP | 2018048866 A | 3/2018 |
| WO | 2011070927 A1 | 4/2013 |

OTHER PUBLICATIONS

Notice of Reasons for Refusal dated Mar. 24, 2023 in connection with Japanese Patent Application No. 2019-139536, 8 pgs (including translation).

* cited by examiner

SURVEYING APPARATUS, SURVEYING METHOD, AND SURVEYING PROGRAM

CROSS REFERENCE TO RELATED APPLICATIONS

This application claims priority to Japanese Patent Application No. 2019-139536, filed Jul. 30, 2019, the disclosure of which is incorporated herein in its entirety.

FIELD

The present invention relates to a technique for laser scanning.

BACKGROUND

There may be parts that are not irradiated by scanning laser light in laser scanning. In this case, it is necessary to again perform laser scanning of an area that could not be scanned at the previous time by changing the instrument point or the viewpoint. Japanese Patent No. 5057734 discloses a technique for again performing laser scanning of a part that was not scanned.

SUMMARY

An object of the present invention is to provide a technique for decreasing a work burden required in reselecting an instrument point, which is caused by the limited emission range of scanning laser light.

The present invention provides a surveying apparatus having a combined structure of a total station and a laser scanner. Relationships of exterior orientation parameters between the total station and the laser scanner are known in advance. The surveying apparatus includes a point cloud data acquiring unit, a distance acquiring unit, and an instrument point calculator. The point cloud data acquiring unit acquires point cloud data that is obtained in laser scanning performed by the surveying apparatus set up at a first instrument point. The distance acquiring unit acquires a distance to the laser scanner of each point in the point cloud data. The instrument point calculator calculates a location of a second instrument point on the basis of an upper limit of the distance.

In the present invention, the total station preferably includes a marking light emitting unit that emits marking light, and the marking light is preferably emitted to the second instrument point. In the present invention, the total station preferably has a function of positioning a target, and the surveying apparatus preferably includes a comparison data generating unit that generates data in which the location of the target and the location of the second instrument point are compared with each other.

In the present invention, the total station preferably has a function of positioning a target, and the surveying apparatus preferably includes a data output unit that outputs data of the location of the target and data of the location of the second instrument point to the outside. In the present invention, it is preferable that the instrument point calculator extract multiple points having longer distances in multiple directions that are different from each other as viewed from the first instrument point, calculate an average location of the extracted multiple points, and calculate the second instrument point on the basis of the average location.

In the present invention, it is preferable that the instrument point calculator extract a point having the longest distance as viewed from the first instrument point, as a reference point, and acquire a location closer to the first instrument point from the reference point, as the second instrument point. In the present invention, the surveying apparatus preferably includes a plane extracting unit that extracts a horizontal plane facing vertically upward, on the basis of the point cloud data, and the second instrument point is preferably selected in the extracted horizontal plane.

The present invention can also be understood to be a surveying method using a surveying apparatus having a combined structure of a total station and a laser scanner. Relationships of exterior orientation parameters between the total station and the laser scanner are known in advance. The surveying method includes acquiring point cloud data that is obtained in laser scanning performed by the surveying apparatus set up at a first instrument point. The surveying method also includes acquiring a distance to the laser scanner of each point in the point cloud data and calculating a location of a second instrument point on the basis of an upper limit of the distance.

The present invention can also be understood to be a non-transitory computer recording medium storing computer executable instructions for controlling surveying that uses a surveying apparatus. The surveying apparatus has a combined structure of a total station and a laser scanner. Relationships of exterior orientation parameters between the total station and the laser scanner are known in advance. The computer executable instructions are made to, when executed by a computer processor, cause the computer processor to acquire point cloud data that is obtained in laser scanning performed by the surveying apparatus set up at a first instrument point, acquire a distance to the laser scanner of each point in the point cloud data, and calculate a location of a second instrument point on a basis of an upper limit of the distance.

The present invention enables reducing a burden necessary in reselecting an instrument point, which is caused by the limited emission range of scanning laser light.

DETAILED DESCRIPTION

1. First Embodiment

Overview

Figure 1A:
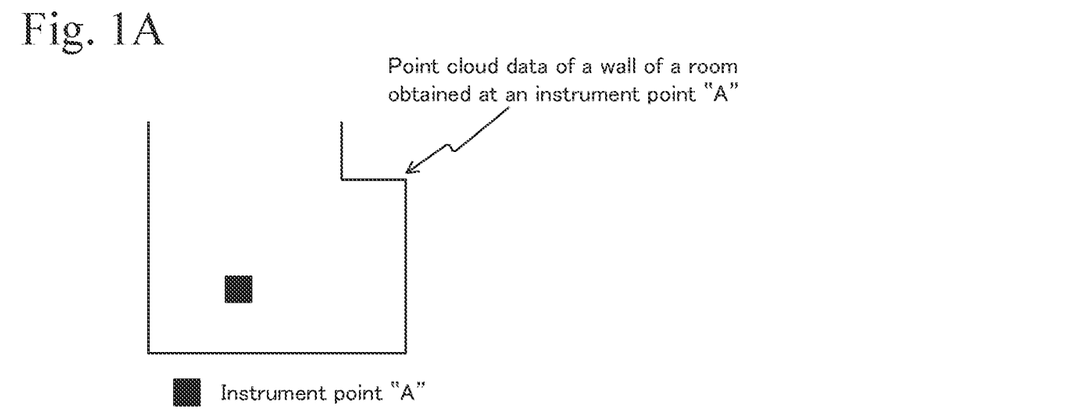
FIGS. 1A to 1C are principle diagrams showing the principle of the present invention.
Figure 1B:
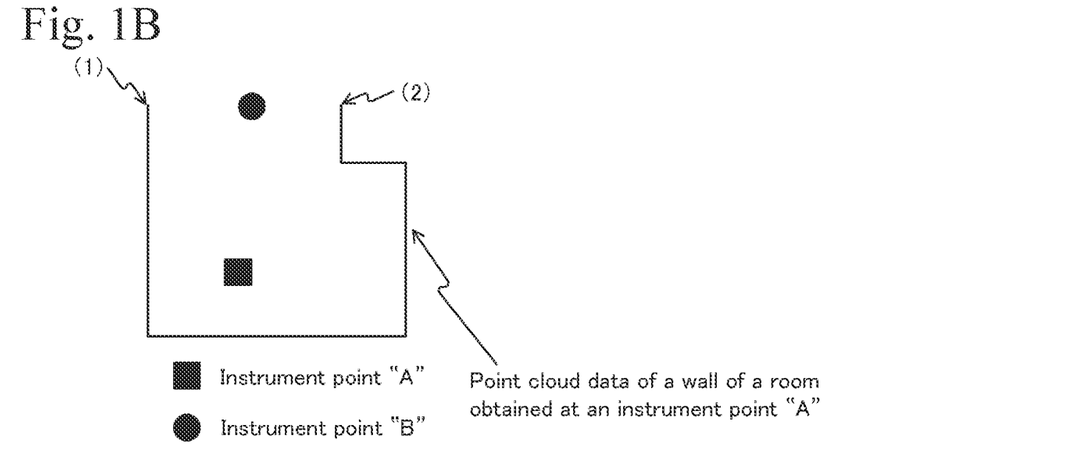
Figure 1C:
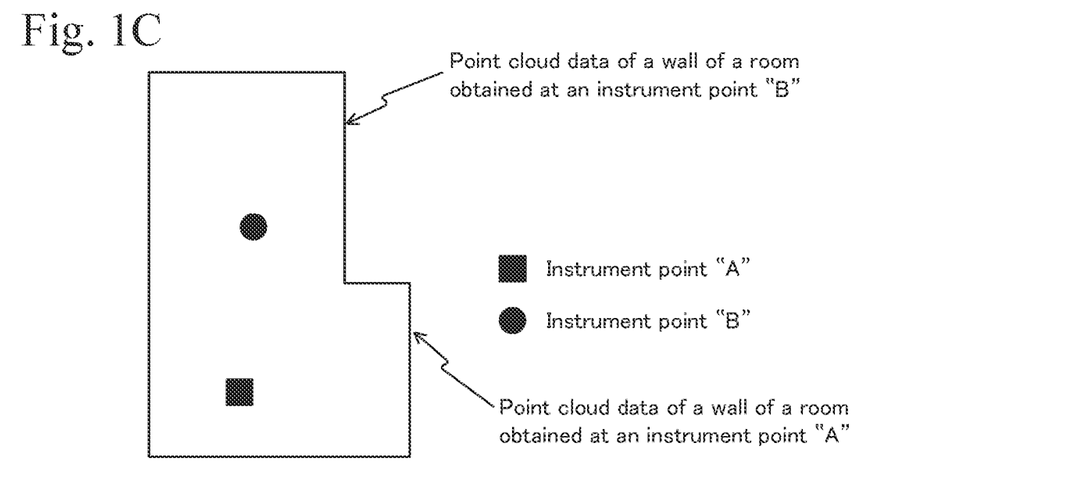

FIGS. 1A to 1C show an overview of an embodiment. This example describes a case of obtaining point cloud data of an interior shape of a room, such as of a wall, a ceiling, a floor, a pillar, or a beam in the room by performing laser scanning of the room. Of course, the target to be subjected to laser scanning is not limited to the interior of a room and may be an object outside.

Figure 2:
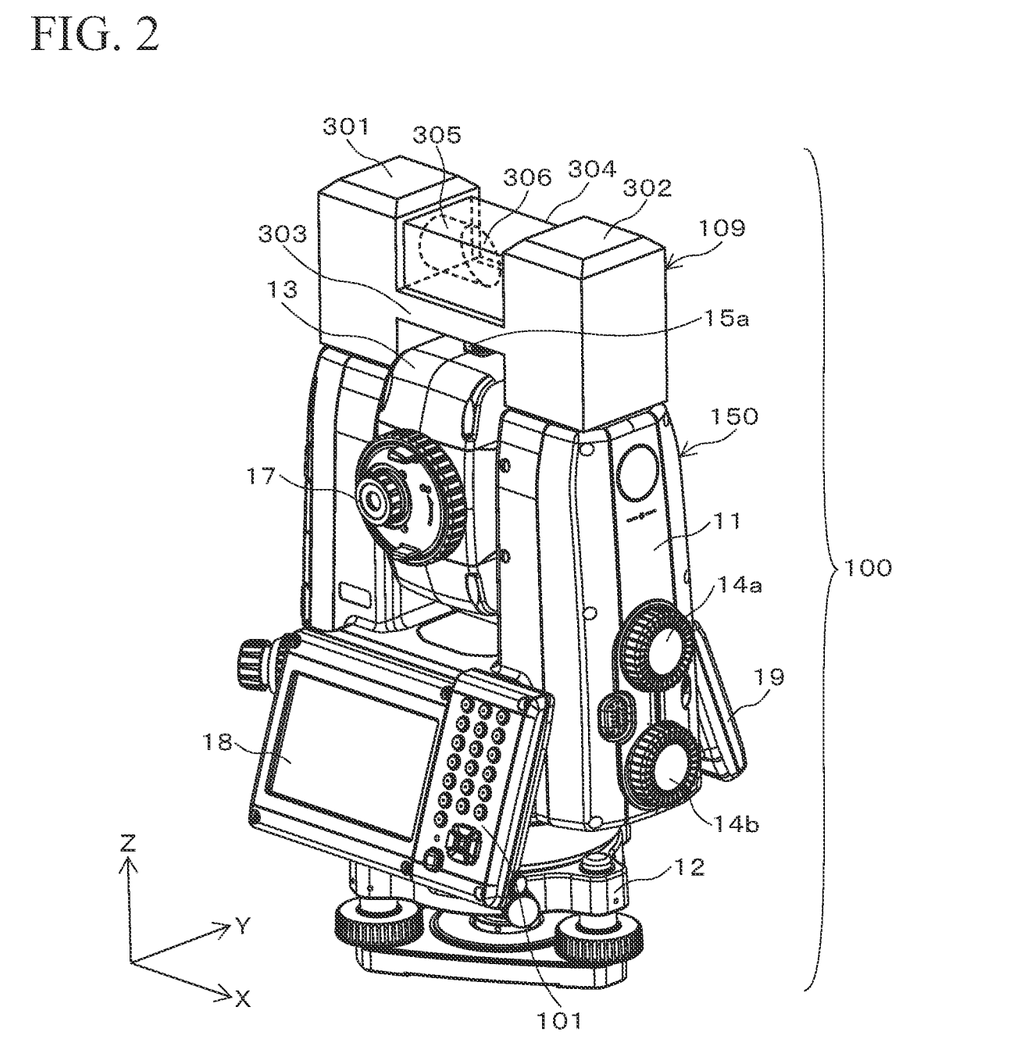
FIG. 2 is a perspective view of a total station equipped with a laser scanner using the present invention.
Figure 3:
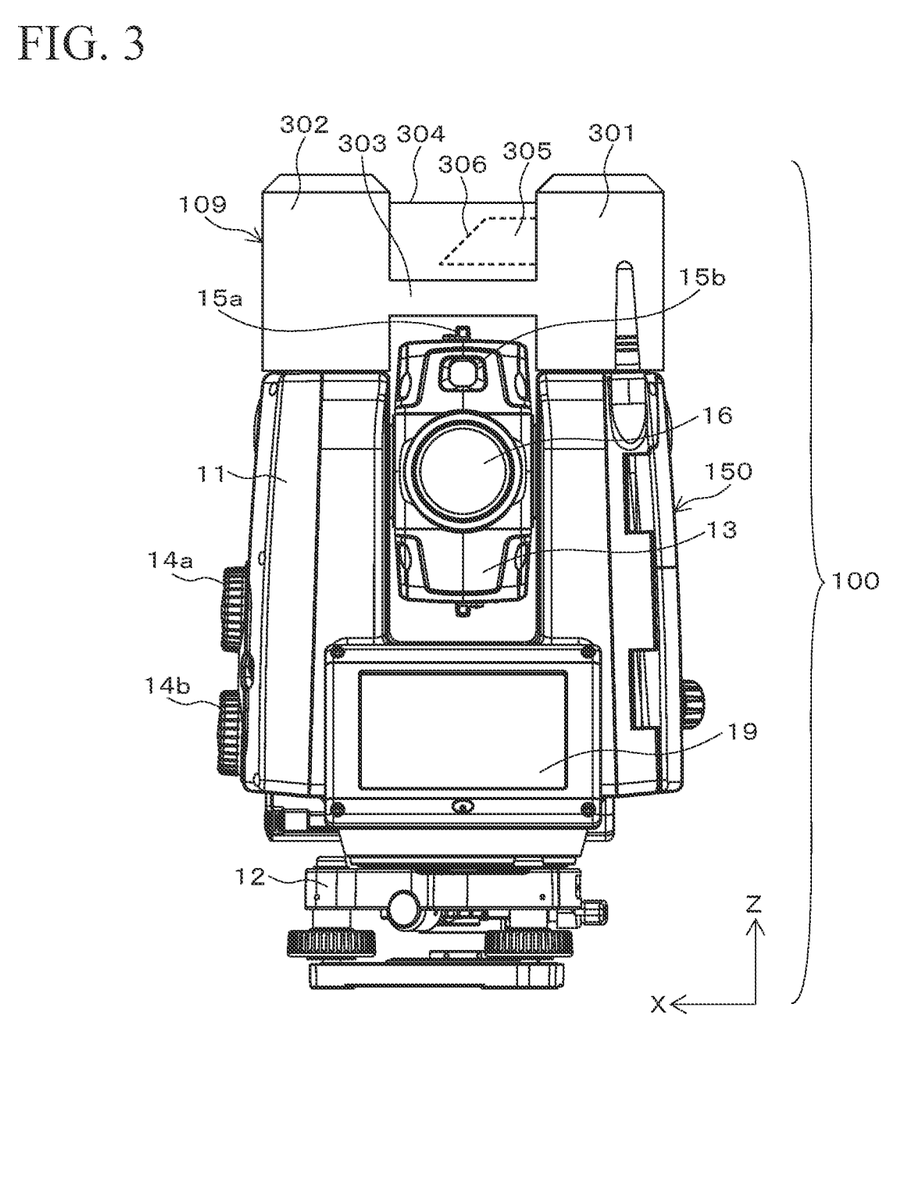
FIG. 3 is a front view of the total station equipped with the laser scanner using the present invention.

This example uses a total station 100 that is equipped with a laser scanner, in which a total station and a laser scanner are combined (refer to FIGS. 2 and 3). This apparatus has a laser marking function. This apparatus emits marking laser light to a location that is designated relative to the location of the apparatus and marks the designated position. Details of the total station 100 equipped with the laser scanner will be described later.

In this example, an intensity of received reflection light, which is laser scanning light reflected back from a target object, is determined by a predetermined threshold, and reflection light having an intensity lower than this threshold is not used. This threshold is set as a lower limit of the intensity of reflection light that provides a reliable value of a measured distance.

The following describes a basic overview by referring to the case in FIGS. 1A to 1C as an example. First, a total station equipped with a laser scanner is set up at a first instrument point, which is represented as an instrument point "A". Herein, the instrument point is a point at which the laser scanner is set up.

When set up at the first instrument point, the total station performs laser scanning of the circumference of the room to obtain a laser scanning point cloud. FIG. 1A is a view as viewed from above in the vertical direction and shows an example in which point cloud data of walls of a room is obtained. In this example, pieces of the point cloud data of the walls are partially discontinuous due to a part at which laser scanning light cannot reach, as shown in FIG. 1A.

After laser scanning is performed at the instrument point "A", 1st to Nth most distant points, as viewed from the instrument point "A", are selected. Note that "N" is a natural number of 2 or more. In the case in FIG. 1A, two points, that is, the first and second most distant points represented as points (1) and (2), are selected at parts at which the point clouds obtained from the walls are discontinuous. The number of the points to be selected is normally two or more, but a case of selecting two points is described herein for simplicity of description.

The points (1) and (2) are selected as follows. First, the first to the Nth most distant points having distances in directions that are different from each other as viewed from the instrument point "A" are extracted. Then, among these extracted points, two points in which the directions are different from each other to some degree and are the first and the second most distant, are further extracted. In the case in FIG. 1A, the points (1) and (2) are extracted as the two points described above. At this time, the top three or more most distant points may be extracted. The difference in direction is defined as an angle of opening in a range of approximately 20 to 90 degrees.

After the points (1) and (2) are obtained, coordinates of points that are acquired by vertically projecting the points (1) and (2) on a floor surface, that is, a location in the horizontal direction of each of the points (1) and (2), are acquired.

Then, an average of the locations in the horizontal direction of the points (1) and (2) is calculated, and this is used as a horizontal location $(X_B, Y_B)$ of another instrument point, which is represented as a second instrument point "B". Moreover, a vertical location, that is, a Z location of the second instrument point "B" is acquired as follows.

First, data of a point that is closest to the location $(X_B, Y_B)$ is extracted from the point cloud data, which is obtained at the instrument point "A", and a Z value of this extracted point is acquired as a Z location, that is, a location in the vertical direction, of the instrument point "B". Thus, a three-dimensional coordinate location $(X_B, Y_B, Z_B)$ of the instrument point "B" is acquired.

The method for acquiring the Z value of the instrument point "B" can also employ the following method. A first other method uses a Z value of the instrument point "A". This method can be employed in a case in which it is clear that the next instrument point is set on the same horizontal plane as a previous instrument point in measuring, e.g., an interior of a room. In this case, after an instrument point "B" is set, marking may be performed on the set location by, for example, adding a mark. Thereafter, a three-dimensional location of the instrument point "B" may be measured by using a total station function of the total station equipped with the laser scanner, and three-dimensional coordinate values of the instrument point "B" may be finally determined.

A second other method is as follows: a horizontal plane, for example, a floor surface or a ground surface, is extracted from the point cloud data obtained at the instrument point "A", a perpendicular is dropped from the location $(X_B, Y_B)$ to the extracted horizontal plane, and a Z coordinate value of a point, at which the perpendicular and the extracted horizontal plane intersect each other, is acquired as $Z_B$.

In the condition in which the three-dimensional coordinate location $(X_B, Y_B, Z_B)$ of the instrument point "B" is acquired, the instrument point "B" as viewed from the instrument point "A" is determined, and the direction of the instrument point "B" from the total station equipped with the laser scanner set up at the instrument point "A", is known. In this state, laser marking light is emitted to the instrument point "B" by using the laser marking function of the total station equipped with the laser scanner set up at the instrument point "A".

An operator sets the instrument point "B" by, e.g., placing a mark at the location on a floor surface marked with the marking light. Then, the total station equipped with the laser scanner set up at the instrument point "A" is moved to, and set up at, the set instrument point "B". Laser scanning is then performed at the instrument point "B", whereby point cloud data of an area that cannot be irradiated from the instrument point "A" is obtained. An example of this is shown in FIG. 1C.

The area that is subjected to laser scanning from the instrument point "B" and the area that is subjected to laser scanning from the instrument point "A" partially overlap.

The instrument point "A" serves as a back point or a rear viewpoint, and the point cloud data that is obtained at the instrument point "B" is described in the coordinate system that describes the point cloud data obtained at the instrument point "A". Alternatively, in the condition in which the location of the instrument point "A" in the absolute coordinate system is known, the instrument point "A" serves as a back point, and the point cloud data obtained at the instrument point "B" is described in the absolute coordinate system.

Guiding to the instrument point "B" by use of the total station may be performed by using a target, for example, a reflection prism. This utilizes the method that is employed in setting a surveying point using a total station. In this technique, a target, for example, a reflection prism, is carried by an operator, and this target is captured by the total station equipped with the laser scanner to measure the location of the target. Then, a location relationship between the instrument point "B" and the target is displayed on a display of a terminal carried by the operator to allow the operator to understand the location of the instrument point "B". The operator finds the location of the instrument point "B" by looking at the display.

After the guiding to the instrument point "B" by use of the marking light is performed, the marking, such as adding a mark to the instrument point "B", may be performed. Then, the three-dimensional location of the marked point may be measured by using the total station function of the total station equipped with the laser scanner, and the coordinate values of the instrument point "B" may be finally determined or confirmed.

Total Station Equipped with Laser Scanner

FIG. 2 shows a perspective view of the total station 100 equipped with the laser scanner using the present invention. FIG. 3 shows a front view of the total station 100 equipped with the laser scanner. The total station 100 equipped with the laser scanner has a combined structure of a total station and a laser scanner 109, which will be described later. The function of the total station is the same as that of an ordinary total station. Details of the structure of the total station are disclosed in, for example, Japanese Unexamined Patent Applications Laid-Open Nos. 2009-229192 and 2012-202821.

The total station 100 equipped with the laser scanner 109 has a combined structure or a complex structure of a TS main body 150 and the laser scanner 109. The total station 100 equipped with the laser scanner 109 has a main unit 11. The main unit 11 is held on a base 12 in a horizontally rotatable state. The base 12 is fixed on a top of a tripod, which is not shown. The main unit 11 has an approximately U shape and has two extending parts that upwardly extend as viewed from a Y-axis direction, and a movable part 13 is held between the two extending parts so as to be controllable in a vertical angle, which includes an elevation angle and a depression angle.

The main unit 11 horizontally rotates relative to the base 12 by electrical operation. That is, the main unit 11 is driven by a motor for controlling a horizontal angle contained in the main unit 11, whereby the main unit 11 is horizontally rotated relative to the base 12. The movable part 13 vertically rotates relative to the main unit 11 by a motor for controlling a vertical angle contained in the main unit 11. The controls of these horizontal rotation and vertical rotation are performed by a vertical and horizontal rotation driving unit 106 contained in the main unit 11 (refer to block diagram in FIG. 4).

The main unit 11 has a horizontal rotation angle controlling dial 14a and an elevation angle controlling dial 14b that are arranged thereon. The horizontal rotation angle controlling dial 14a is operated to adjust a horizontal rotation angle of the main unit 11 or the movable part 13. The elevation angle controlling dial 14b is operated to adjust a vertical angle of the movable part 13. It is also possible to input location data and automatically direct the optical axis of the total station 100 equipped with the laser scanner 109 to a direction contained in the input location data.

The movable part 13 has a rectangular cylindrical sighting unit 15a for approximate sighting, arranged on a top thereof. The movable part 13 also has an optical sighting unit 15b with a visual field narrower than that of the sighting unit 15a and has a telescope 16 that enables more precise sighting.

An image that is captured by the sighting unit 15b and the telescope 16 can be visually recognized by looking into an eyepiece 17. The telescope 16 also serves as an optical system for distance measuring laser light in an infrared band, which is distance measuring light from a laser positioning unit 103, tracking light for tracking and capturing a target to which a distance is to be measured, for example, a dedicated reflection prism serving as a target, and marking laser light in a visible band for performing laser marking. The optical system is designed in such a manner that the optical axes of the distance measuring light, the tracking light, and the marking laser light coincide with the optical axis of the telescope 16.

The distance measuring laser light and the marking laser light may be implemented by one laser light. In this case, the laser light in the visible band is used as the distance measuring laser light and as the marking laser light. The relationships of exterior orientation parameters between the optical system of the movable part 13 and the laser scanner 109 are obtained in advance as design data and are known.

The main unit 11 has displays 18 and 19 mounted thereto. The display 18 is integrated with a controller 101. The controller 101 has a numeric keypad, a cross operation button, and other operation parts arranged thereon, which are used to perform various operations relating to the total station 100 equipped with the laser scanner 109 and are used to input data. The displays 18 and 19 display various information necessary to operate the total station 100 equipped with the laser scanner 109, display surveying data, and display other information. These two displays are respectively mounted on front and back sides of the main unit 11 in order to enable viewing the display from either the front side or the back side without having to rotate the main unit 11.

The laser scanner 109 is fixed on a top of the main unit 11. The laser scanner 109 has a first column 301 and a second column 302. The first column 301 and the second column 302 are connected by a connecting part 303. The space above the connecting part 303 between the first column 301 and the second column 302 is covered with a protective case 304. The protective case 304 is made of a member that transmits the scanning laser light. The protective case 304 houses a rotating part 305 that protrudes from the first column 301 in an X-axis direction. A tip of the rotating part 305 is obliquely cut off, and this tip has a tilt mirror 306 fixed thereon.

The rotating part 305 is driven to be rotated around the X-axis by a motor contained in the first column 301. The first column 301 contains, in addition to the motor, a driving circuit for driving the motor, a control circuit for the driving circuit, a sensor for measuring a rotation angle of the rotating part 305, and a peripheral circuit of the sensor.

The second column 302 contains a light emitting part for emitting laser scanning light, a light receiving part for receiving the scanning light reflected back from a target object, an optical system relating to the light emitting part and the light receiving part, and a distance calculator that calculates a distance to a scanned point, which is a point reflecting the scanning light. The laser scanner 109 also includes a scanned point location calculator that calculates three-dimensional coordinates of the scanned point based on a rotation angle, or more precisely, a vertical rotation angle, of the rotating part 305, a horizontal rotation angle of the main unit 11, and a distance to the scanned point.

The relationships of exterior orientation parameters between an optical system of the laser scanner 109 and the optical system inside the movable part 13, which is an optical system of the laser positioning unit 103, are known as design data. That is, the position relationship of the optical origin between the laser scanner 109 and the laser positioning unit 103 is known, and the relationship of attitude between the laser scanner 109 and the laser positioning unit 103 is also known.

The laser scanning light is emitted from the inside of the second column 302 to the tilt mirror 306 and is reflected thereat to exit to the outside via the transparent protective case 304. The scanning light that is reflected back from a target object turns back the path of the emitted light and is received by the light receiving part in the second column 302.

The scanned point, which is a point reflecting the scanning laser light, is positioned by referring to light emission timing and light reception timing of the scanning light as well as the vertical rotation angle of the rotating part 305 and the horizontal rotation angle of the main unit 11 at each of these timings. The principle of this positioning is the same as that for normal laser distance measurement.

The principle of the laser distance measurement of the laser scanner 109 will be briefly described hereinafter. Basically, light velocity is constant. Thus, in the condition in which a flight time and a direction of distance measuring light are determined, a vector starting from an optical origin of an optical system is set, and a location of a point reflecting the distance measuring light relative to the optical origin is calculated. This principle also applies to laser positioning of the laser positioning unit 103.

The flight time of the distance measuring light is known from a difference between light emission timing and light reception timing, or a difference in light reception timing or a phase difference between the distance measuring light and reference light that has propagated through a reference optical path having a known distance. The emission direction of the distance measuring light is known from the vertical rotation angle of the rotating part 305 and the horizontal rotation angle of the main unit 11 at the time of light emission. The vertical rotation angle of the rotating part 305 and the horizontal rotation angle of the main unit 11 are measured by the vertical and horizontal rotation angle measuring unit 107.

The laser scanning light is emitted in a pulsed manner, reflected at the tilt mirror 306, and is then emitted intermittently to the outside from the protective case 304. At this time, the laser scanning light is emitted while the rotating part 305 rotates. As a result, laser scanning in a vertical plane, which is a Y-Z plane around the X-axis, that is, laser scanning along the vertical plane, is performed. Simultaneously, laser scanning in the horizontal direction is also performed by horizontally rotating the main unit 11 around a Z-axis. Thus, laser scanning is performed on the entire circumference or a necessary area. The laser scanning light may be emitted once in order to use one beam or may be emitted multiple times at a time in order to use multiple beams.

The technique relating to the laser scanner is disclosed in Japanese Unexamined Patent Applications Laid-Open Nos. 2010-151682 and 2008-268004, U.S. Pat. Nos. 8,767,190 and 7,969,558, U.S. Patent Application Publication No. 2017/0269197, etc. A laser scanner that electronically scans, as disclosed in U.S. Patent Application Publication No. 2015/0293224, can also be employed.

Block Diagram

Figure 4:
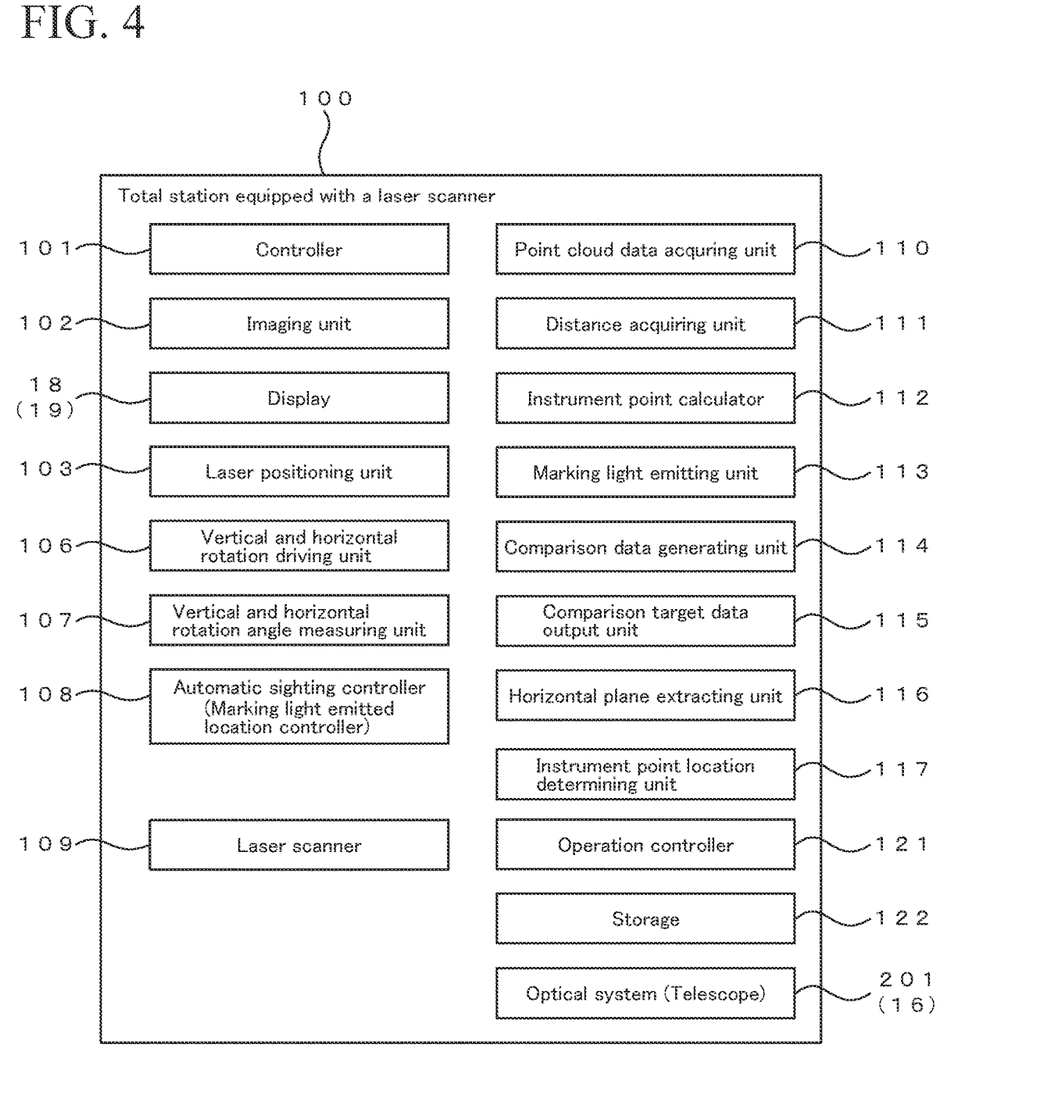
FIG. 4 is a block diagram of the total station equipped with the laser scanner using the present invention.

FIG. 4 shows a block diagram of the total station (TS) 100. The basic functions of the total station 100 equipped with the laser scanner 109 as a total station are the same as for existing ones. The total station 100 equipped with the laser scanner 109 differs from an existing total station in that it is combined with the laser scanner 109, a location of the next instrument point is calculated, and laser marking can be performed by emitting marking laser light to the location of the next instrument point.

The total station 100 equipped with the laser scanner 109 includes the controller 101, an imaging unit or camera 102, the displays 18 and 19, the laser positioning unit 103, the vertical and horizontal rotation driving unit 106, the vertical and horizontal rotation angle measuring unit 107, an automatic sighting controller or marking light emitted location controller 108, the laser scanner 109, a point cloud data acquiring unit 110, a distance acquiring unit 111, an instrument point calculator 112, a marking light emitting unit 113, a comparison data generating unit 114, a comparison target data output unit 115, a horizontal plane extracting unit 116, an instrument point location determining unit 117, an operation controller 121, a storage 122, and an optical system 201 or a telescope 16.

The automatic sighting controller or marking light emitted location controller 108, the point cloud data acquiring unit 110, the distance acquiring unit 111, the instrument point calculator 112, the comparison data generating unit 114, the comparison target data output unit 115, the horizontal plane extracting unit 116, the instrument point location determining unit 117, and the operation controller 121 are functional units that are implemented by a computer. Each of these functional units is implemented by executing a specific program by a computer.

The computer may be a general-purpose microcomputer or may be a dedicated processor composed of, e.g., a field programmable gate array (FPGA). At least one of these functional units may be composed of a dedicated electronic circuit. Alternatively, or additionally, at least one of the functional units may be implemented by using an arithmetic operation section of an external personal computer (PC) or of a server.

The laser positioning unit 103 performs three-dimensional positioning using laser light, which is a basic function of a total station. The principle of positioning is the same as that of the laser scanner 109. The optical system 201 includes the sighting unit 15b (refer to FIG. 3), the telescope 16 (refer to FIG. 3), the optical system of the laser positioning unit 103, an optical system of the imaging unit 102, an optical system constituting an optical path for the tracking light, which is not shown, and an optical system constituting an optical path for marking light that is emitted from the marking light emitting unit 113. The distance measuring light from the laser positioning unit 103 and the marking light from the marking light emitting unit 113 are emitted on the optical axis of the telescope 16 from an objective lens of the telescope 16.

The optical system 201 includes various types of lenses, a mirror, a dichroic mirror for separating an optical path or combining optical paths, a half mirror, a polarizing mirror, and other components. With use of the optical system 201, the distance measuring laser light is emitted to a target object to be positioned, via the telescope 16, and the distance measuring laser light that is reflected back from the target object to be positioned, is received via the telescope 16. The optical system 201 leads an image that is captured by the telescope 16, to the eyepiece 17 and to the imaging unit 102. The marking light that is emitted from the marking light emitting unit 113 is emitted to a location to be marked, via the optical system 201.

The total station 100 equipped with the laser scanner 109 also includes a tracking-light emitting unit, a tracking-light receiving unit, and a tracking controller. The tracking-light emitting unit emits tracking light for tracking a target, for example, a reflection prism. The tracking-light receiving unit receives the tracking light that is reflected back from the target. The tracking controller outputs a control signal to the vertical and horizontal rotation driving unit 106 so that the tracking light will come to a sighting position in a visual field of the telescope 16. These components are the same as those of a product that is currently sold commercially, and therefore, detailed descriptions thereof are omitted. The configuration relating to the tracking light of the TS is disclosed in, for example, Japanese Patent No. 5124319.

The controller 101 receives a content of operation performed at the total station 100 equipped with the laser scanner 109, by an operator. This operation includes operation relating to laser scanning using the laser scanner 109. The operation of the total station 100 equipped with the laser scanner 109 is performed by use of a button switch or the like, which is provided thereto. A tablet or a smartphone may also be used as a controller. In this case, dedicated application software is installed in a tablet or a smartphone to make the table or the smartphone function as a control means of the total station 100 equipped with the laser scanner 109.

The imaging unit 102 images an image that is captured by the telescope 16. The imaging is performed by, for example, a charge-coupled device (CCD) image sensor or a complementary metal oxide semiconductor (CMOS) image sensor. The displays 18 and 19 show an image taken by the imaging unit 102, information necessary to operate the total station 100 equipped with the laser scanner 109, information relating to movement of the total station 100 equipped with the laser scanner 109, such as distance measuring data and an azimuth of a target, and other information. Each of the displays 18 and 19 uses, e.g., a liquid crystal display or an electroluminescent (EL) display.

The vertical and horizontal rotation driving unit 106 drives to horizontally rotate the main unit 11 and drives to vertically rotate the movable part 13. The vertical and horizontal rotation driving unit 106 includes a motor, a gear mechanism, and a driving circuit, for performing the driving.

The vertical and horizontal rotation angle measuring unit 107 measures a horizontal rotation angle of the main unit 11 and measures a vertical angle in terms of an elevation angle or a depression angle of the movable part 13. The angle is measured by using a rotary encoder. The horizontal rotation angle is measured, for example, in a clockwise direction starting from the direction of north as 0 degrees as viewed from above. The vertical angle in terms of an elevation angle or a depression angle is measured on the condition that an elevation direction is positive and a depression direction is negative, starting from the horizontal direction as 0 degrees.

The automatic sighting controller or marking light emitted location controller 108 performs controlling to emit laser marking light to the location of the next instrument point, which is calculated by the instrument point calculator 112. This control involves controlling to direct the optical axis of the marking light in a direction of the next instrument point as viewed from the current instrument point and controlling to emit the marking light.

The laser scanner 109 performs laser scanning. Laser scanning data is obtained by performing laser scanning. The laser scanning light is intermittently emitted at a frequency of several kHz to several tens of kHz. Laser scanning is performed in such a manner that light is emitted while the main unit 11 is horizontally rotated and the rotating part 305 is vertically rotated.

In laser scanning, a horizontal angle of the main unit 11 and a vertical angle of the rotating part 305 at the time of emission of the scanning light are measured. In addition, a distance to the scanned point is calculated from a flight time of the scanning light. These pieces of data of the horizontal angle of the main unit 11, the vertical angle of the rotating part 305, and the distance to the scanned point at the time of emission of the scanning light are contained in the laser scanning data.

Moreover, an intensity of received light, which is the scanning light reflected back from the scanned point, is measured. Data of this intensity of the received light is obtained as scanning data associated with each corresponding scanned point.

On the basis of the laser scanning data, point cloud data is obtained. The point cloud data is a set of pieces of data of three-dimensional coordinates in terms of (X, Y, Z) coordinates of each scanned point, which is a point reflecting scanning light. A location of each point is calculated from data of the direction and the distance of each corresponding point contained in the laser scanning data, in terms of coordinates in a three-dimensional orthogonal coordinate system that has the optical origin of the laser scanner 109 as an origin.

A scanned point having a reflection intensity of a predetermined threshold or less is not used, and point cloud data of this scanned point is not acquired in generating the point cloud data. This is to prevent erroneous detection of a point cloud. An appropriate value is experimentally obtained in advance as the threshold.

The laser scanner 109 includes an arithmetic operation circuit that performs a process of converting the laser scanning data into point cloud data. Thus, the laser scanner 109 is able to output the point cloud data in addition to the laser scanning data. This process may be performed by an external device. In this case, the laser scanning data is output to the outside, and this data is converted into point cloud data by a dedicated PC, a general-purpose PC, a server, or other device.

In the condition in which exterior orientation parameters (location and attitude) in the absolute coordinate system of the laser scanner 109 are known, location of each point constituting the point cloud data is described in the absolute coordinate system. The absolute coordinate system is a coordinate system for describing global navigation satellite system (GNSS) data or map data. The location in the absolute coordinate system is described in terms of, for example, latitude, longitude, and elevation.

The point cloud data acquiring unit 110 acquires the point cloud data obtained by the laser scanner 109. In this example, the point cloud data obtained by the laser scanner 109 is stored in the storage 122.

In order to calculate a new instrument point, the point cloud data that is already obtained is read from the storage 122 and is acquired by the point cloud data acquiring unit 110. The point cloud data may be stored in an appropriate storage medium or a storage device and may be acquired therefrom. Alternatively, laser scanning data may be stored first, this laser scanning data may be read and converted into point cloud data and then acquired by the point cloud data acquiring unit 110 in calculating a new instrument point.

The distance acquiring unit 111 acquires data of a distance from the total station 100 equipped with the laser scanner 109, to each point of the point cloud data. The data of this distance is contained in the laser scanning data.

The instrument point calculator 112 performs a process relating to calculation of a three-dimensional location of the next instrument point based on the principle described in relation to FIGS. 1A to 1C. The next instrument point is a new instrument point to be used for obtaining a point cloud in an area that is outside of the emission range of the laser scanning light. For example, in a condition in which point cloud data that is obtained at the instrument point "A" in FIG. 1A is acquired, a process of calculating a location of the instrument point "B" is performed by the instrument point calculator 112.

The marking light emitting unit 113 emits laser light for marking, that is, laser marking light. The laser marking light is visible light and marks using a bright spot of a point that is irradiated.

The comparison data generating unit 114 generates comparison data in which location data of the new instrument point obtained by calculation and location data of a target, for example, a reflection prism, positioned by the laser positioning unit 103 are compared with each other. An example of the comparison data includes a data visualization map showing a relative location relationship between the instrument point obtained by calculation and the target positioned by the laser positioning unit 103.

The comparison target data output unit 115 outputs the base data of the comparison data, that is, data of the location of the instrument point obtained by calculation and data of the location of the target positioned by the laser positioning unit 103, to the outside, such as an external terminal.

The horizontal plane extracting unit 116 extracts data of a plane from the point cloud data acquired by the point cloud data acquiring unit 110. Herein, a plane facing vertically upward is extracted. Extraction of a plane from the point cloud data uses a publicly known technique for generating a three-dimensional model from point cloud data. This technique is disclosed in, for example, WO2011/070927 and Japanese Unexamined Patent Applications Laid-Open Nos. 2012-230594 and 2014-35702.

The instrument point location determining unit 117 determines whether the new instrument point that is calculated by the instrument point calculator 112, for example, the instrument point "B" in FIG. 1B, is appropriate as an instrument point. Herein, it is determined whether the instrument point obtained by calculation is in a plane that is extracted by the horizontal plane extracting unit 116.

Figure 5:
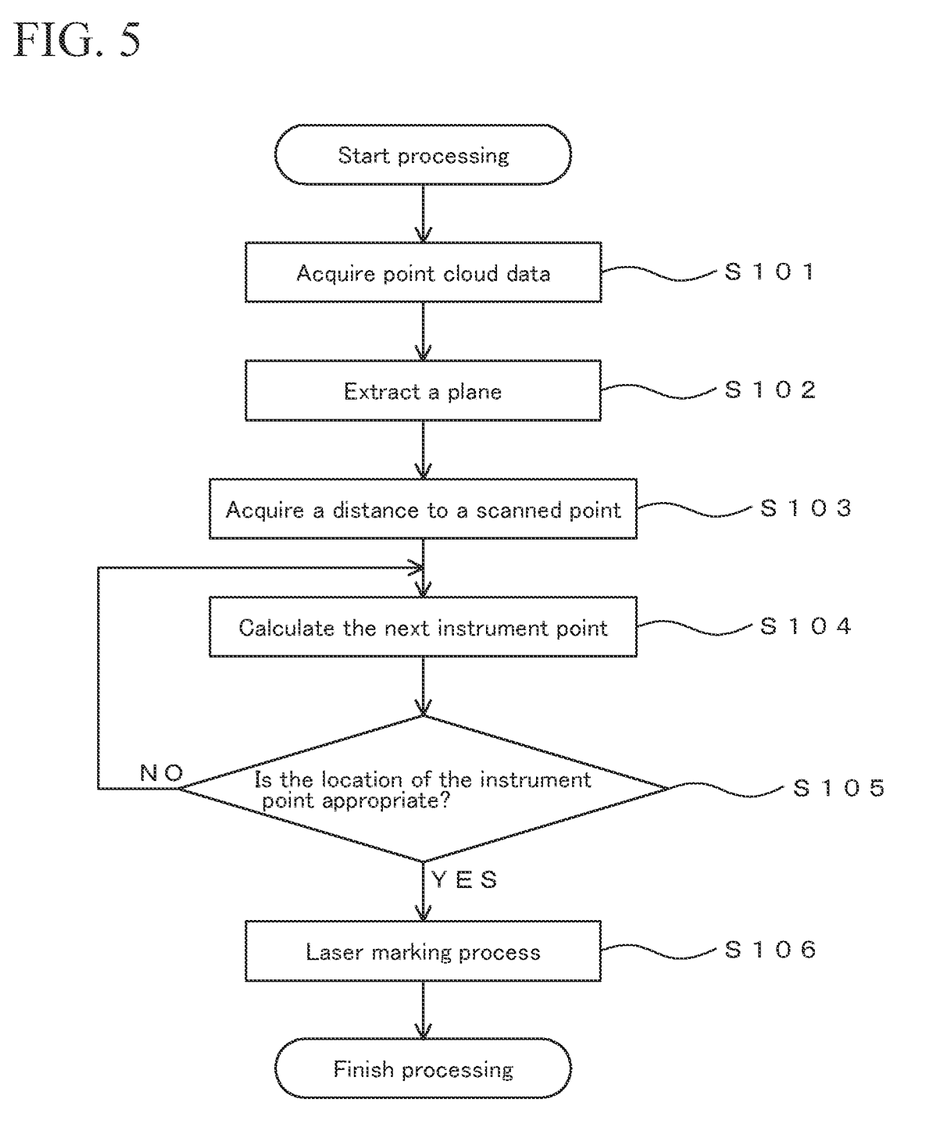
FIG. 5 is a flowchart showing an example of a processing procedure.

The operation controller 121 generally controls operations of the total station 100 equipped with the laser scanner 109. For example, the procedure of processes relating to processing in FIG. 5 is controlled by the operation controller 121. The storage 122 stores data and a program necessary to operate the total station 100 equipped with the laser scanner 109 and stores surveying data acquired as a result of the operation of the total station 100 equipped with the laser scanner 109. The storage 122 also stores laser scanning data obtained by the laser scanner 109 and stores point cloud data calculated on the basis of the laser scanning data.

Example of Processing

FIG. 5 is a flowchart showing an example of a processing procedure performed by using the total station 100 equipped with the laser scanner 109. The program for executing the processing in FIG. 5 is stored in the storage 122 or an appropriate storage medium. This processing procedure is controlled and executed by the operation controller 121. It is also possible to store this program in an appropriate storage medium or a storage device accessible via a communication line, such as a data server, and to download it therefrom. The processing in FIG. 5 may be executed by a personal computer (PC), a server, or other device.

The following processing is performed in the situation in FIG. 1A. In this situation, first laser scanning is already performed by the total station 100 equipped with the laser scanner 109 set up at the first instrument point "A". In the situation shown in FIG. 1A, point cloud data of only approximately a half of the inside of the room is obtained due to an effective emission range of the laser scanning light. In view of this, calculation is performed to obtain a location of the next instrument point "B" that is suitable to obtain point cloud data in an area from which point cloud data is still not obtained. An example of a procedure of this processing is shown in FIG. 5.

After the processing starts, first, point cloud data "A" that is obtained at the first instrument point, which is represented as the instrument point "A" is acquired (step S101).

After the point cloud data is acquired, a horizontal plane facing vertically upward is extracted (step S102). This process is performed by the horizontal plane extracting unit 116. Herein, the total station 100 equipped with the laser scanner 109 is difficult to set up on a ceiling surface or on a wall, and therefore, a plane facing vertically upward, such as a floor surface, is selected.

Next, data of a distance from the total station 100 equipped with the laser scanner 109 to each point of the point cloud data is acquired from the laser scanning data (step S103). This process is performed by the distance acquiring unit 111.

Then, a three-dimensional location of the instrument point "B" is calculated by the method described in relation to FIGS. 1A to 1C (step S104). This process is performed by the instrument point calculator 112.

The instrument point "B" is desirably on a horizontal plane, such as a floor surface, because the total station 100 equipped with the laser scanner 109 is to be set up thereat. In consideration of this, appropriateness of the instrument point that is obtained in step S104 is determined (step S105). Herein, it is determined whether the instrument point "B" is on a plane suitable for setting up the total station 100 equipped with the laser scanner 109. This process is performed by the instrument point location determining unit 117.

The following describes an example of the process in step S105. In this example, a three-dimensional Cartesian coordinate system (X, Y, Z) is adopted as the coordinate system. This coordinate system describes a location in a plane by (X, Y) and describes a location in a vertical direction by Z. The coordinate system to be used may be a local coordinate system or the absolute coordinate system.

It is assumed that coordinates of a second instrument point obtained by calculation are represented as $(X_2, Y_2, Z_2)$. In this case, whether the second instrument point $(X_2, Y_2, Z_2)$ is in the plane that is extracted in step S102 is determined in step S105.

In the case in which the second instrument point calculated in step S104 is not in the plane that is obtained in step S102, the condition of the process in step S104 is modified, and the process in step S104 is performed again. Then, the process in step S105 is performed again.

In the case in which the second instrument point calculated in step S104 is on the plane extracted in step S102, the procedure advances to step S106, and marking light is emitted to the instrument point "B". In this process, the horizontal rotation angle of the main unit 11 and the vertical rotation angle of the movable part 13 are adjusted to direct the optical axis of the telescope 16 to the instrument point "B", and the marking light is then emitted to the instrument point "B".

2. Second Embodiment

In this example, guiding to the instrument point "B" is performed by using a reflection prism. First, a location of the instrument point "B" is obtained. The procedure for obtaining the instrument point "B" is the same as in the first embodiment. After the location of the instrument point "B" is obtained, the total station 100 equipped with the laser scanner 109 captures a reflection prism, which is a target carried by an operator, and a location of the reflection prism is measured. Then, a location relationship between the instrument point "B" and the reflection prism is displayed on a terminal carried by the operator, such as a smartphone or a tablet, to allow the operator to understand the location of the instrument point "B".

The operator finds the location of the instrument point "B" by looking the display and then marks the location of the instrument point "B" by, e.g., placing a marker. Meanwhile, the total station 100 continues tracking the reflection prism and continuously positions the reflection prism.

An example of information that is displayed on the terminal carried by the operator includes map information centering at the location of the reflection prism. The displayed data is generated inside the total station 100 equipped with the laser scanner 109 (first manner) or by the terminal (second manner).

In the first manner, the displayed data is generated by the comparison data generating unit 114, and this data is sent wirelessly to the terminal carried by the operator. In the second manner, the location data of the second instrument point and the location data of the reflection prism positioned by the laser positioning unit 103 are sent as base data of the displayed data, from the comparison target data output unit 115 to the terminal carried by the operator. In this case, map data is generated by the terminal.

3. Third Embodiment

The calculation of the next instrument point and relevant processes may be performed by an external device. In this case, the laser scanning data or the point cloud data is output from the total station 100 equipped with the laser scanner 109 and is received by an external dedicated calculation terminal or a PC or server in which a program for executing processing relating to the calculation of the instrument point is installed, and the processing relating to the calculation of the instrument point of the present invention is performed thereat.

In this case, the external device functions as a surveying data processing device and includes one or multiple or all of the distance acquiring unit 111, the instrument point calculator 112, the comparison data generating unit 114, the comparison target data output unit 115, the horizontal plane extracting unit 116, and the instrument point location determining unit 117. In addition, the present invention can also be understood to be a method for processing surveying data by using this surveying data processing device and as a program for processing surveying data, which makes the surveying data processing device operate.

4. Fourth Embodiment

The second instrument point in FIG. 1B may also be calculated by the following method. In this case, the following process is performed by the instrument point calculator 112. In this process, a point at a specific distance of, for example, approximately 1 to 5 meters, in the direction of the instrument point "A" from the point (1) or (2) at an end of the point cloud in FIG. 1B is set as the second instrument point "B". Also in this case, a Z value is acquired in the same manner as in the first embodiment. In one example, a point brought close to the current instrument point, e.g., the instrument point "A", from an end or a farthest end, e.g., the point (1), is selected inside an outer circumferential line that provides the point clouds, as the second instrument point, e.g., the instrument point "B".

5. Fifth Embodiment

At the time when an instrument point is set for second scanning, coordinates of the first instrument point and coordinates of the second instrument point may be automatically registered in an application program as a rear viewpoint and an instrument point, respectively.

What is claimed is:

1. A surveying apparatus having a combined structure of a total station and a laser scanner, relationships of exterior orientation parameters between the total station and the laser scanner being known in advance, the surveying apparatus comprising a processor or circuitry, the processor or circuitry configured to:
    acquire point cloud data that is obtained through laser scanning performed by the surveying apparatus set up at a first instrument point;
    acquire a distance to the laser scanner of each point in the point cloud data; and
    calculate a location of a second instrument point on a of the distance, and on a basis of,
    extraction, from among the point cloud data, 1st to Nth most distant points having distances in directions that are different from each other as viewed from the first instrument point, "N" being a natural number of 2 or more; and
    calculation of an average of locations in a horizontal direction of the N number of extracted points.

2. The surveying apparatus according to claim 1, wherein the total station includes a marking light emitting unit that emits a marking light, and the marking light is emitted to the second instrument point.

3. The surveying apparatus according to claim 1, wherein the total station is configured to position a target, and the processor or circuitry is further configured to generate data in which location of the target and the location of the second instrument point are compared with each other.

4. The surveying apparatus according to claim 1, wherein the total station is configured to position a target, and the processor or circuitry is further configured to output data of the location of the target and data of the location of the second instrument point to the outside.

5. The surveying apparatus according to claim 1, wherein the calculation of the location of the second instrument point involves
    extraction of a point having the longest distance as viewed from the first instrument point, as a reference point, and
    acquisition of a location at a specific distance to the first instrument point from the reference point, as the second instrument point.

6. The surveying apparatus according to claim 1, wherein the processor or circuitry is further configured to extract a horizontal plane facing vertically upward, on a basis of the point cloud data, and the second instrument point is selected on the extracted horizontal plane.

7. A surveying method using a surveying apparatus having a combined structure of a total station and a laser scanner, relationships of exterior orientation parameters between the total station and the laser scanner being known in advance, the surveying method comprising:
    acquiring point cloud data that is obtained through laser scanning performed by the surveying apparatus set up at a first instrument point;

acquiring a distance to the laser scanner of each point in the point cloud data; and calculating a location of a second instrument point on a basis of the distance, and on a basis of, extracting, from among the point cloud data, 1st to Nth most distant points having distances in directions that are different from each other as viewed from the first instrument point, "N" being a natural number of 2 or more; and calculating an average of locations in a horizontal direction of the N number of extracted points.

8. A non-transitory computer recording medium storing computer executable instructions for controlling surveying that uses a surveying apparatus, the surveying apparatus having a combined structure of a total station and a laser scanner, relationships of exterior orientation parameters between the total station and the laser scanner being known in advance, the computer executable instructions made to, when executed by a computer processor, cause the computer processor to:

acquire point cloud data that is obtained through laser scanning performed by the surveying apparatus set up at a first instrument point;

acquire a distance to the laser scanner of each point in the point cloud data; and calculate a location of a second instrument point on a basis of the distance, and on a basis of, extraction, from among the point cloud data, 1st to Nth most distant points having distances in directions that are different from each other as viewed from the first instrument point, "N" being a natural number of 2 or more; and calculation of an average of locations in a horizontal direction of the N number of extracted points.

\* \* \* \* \*

UNITED STATES PATENT AND TRADEMARK OFFICE
CERTIFICATE OF CORRECTION

PATENT NO. : 11,725,938 B2
APPLICATION NO. : 16/917941
DATED : August 15, 2023
INVENTOR(S) : You Sasaki It is certified that error appears in the above-identified patent and that said Letters Patent is hereby corrected as shown below:

In the Claims

Column 14, Line 24, Claim 1:
1. A surveying apparatus having a combined structure of a total station and a laser scanner, relationships of exterior orientation parameters between the total station and the laser scanner being known in advance, the surveying apparatus comprising a processor or circuitry, the processor or circuitry configured to:
    acquire point cloud data that is obtained through laser scanning performed by the surveying apparatus set up at a first instrument point;
    acquire a distance to the laser scanner of each point in the point cloud data; and
    calculate a location of a second instrument point on a of the distance, and on a basis of,
    extraction, from among the point cloud data, 1st to Nth most distant points having distances in directions that are different from each other as viewed from the first instrument point, "N" being a natural number of 2 or more; and
    calculation of an average of locations in a horizontal direction of the N number of extracted points.

Should read:
1. A surveying apparatus having a combined structure of a total station and a laser scanner, relationships of exterior orientation parameters between the total station and the laser scanner being known in advance, the surveying apparatus comprising a processor or circuitry, the processor or circuitry configured to:
    acquire point cloud data that is obtained through laser scanning performed by the surveying apparatus set up at a first instrument point;
    acquire a distance to the laser scanner of each point in the point cloud data; and
    calculate a location of a second instrument point on a basis of the distance, and on a basis of,
    extraction, from among the point cloud data, 1st to Nth most distant points having distances in directions that are different from each other as viewed from the first instrument Signed and Sealed this
Thirtieth Day of January, 2024

*Katherine Kelly Vidal*
Katherine Kelly Vidal
*Director of the United States Patent and Trademark Office* point, "N" being a natural number of 2 or more; and
calculation of an average of locations in a horizontal direction of the N number of extracted points.